Jan. 25, 1927.
S. B. LONG ET AL
1,615,641
ICE CREAM MOLD
Filed July 30, 1925
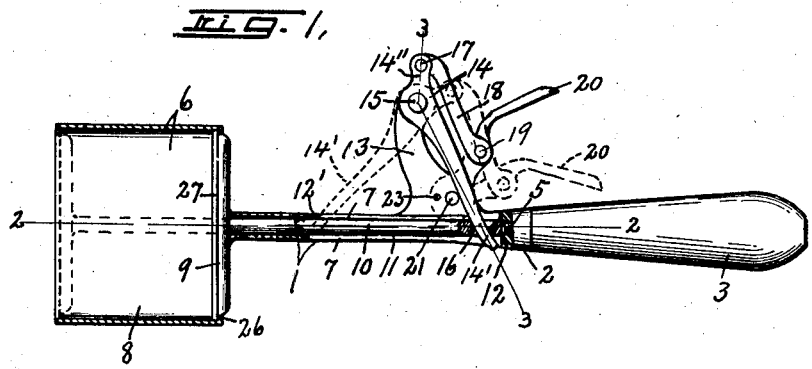
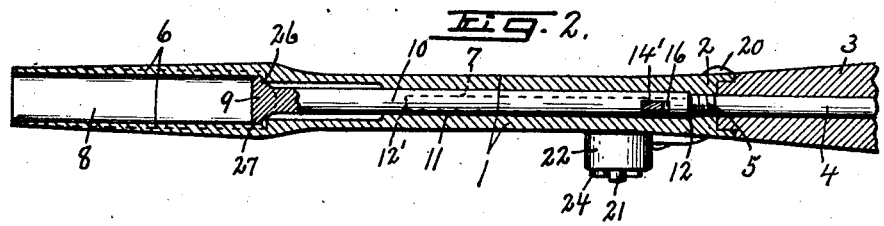
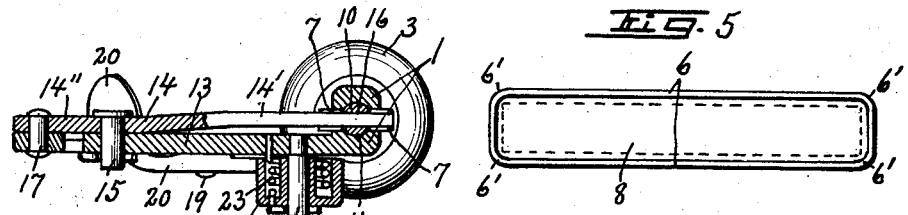
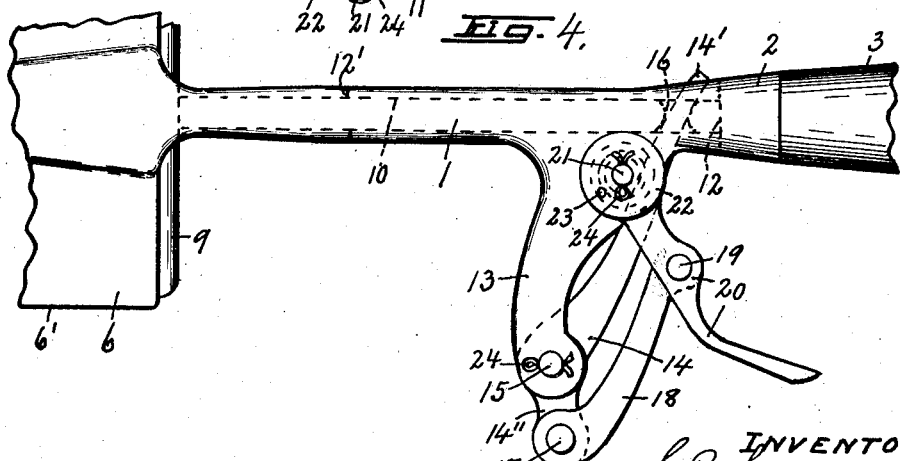

Patented Jan. 25, 1927.

1,615,641

UNITED STATES PATENT OFFICE.

STEPHEN B. LONG AND JOHN C. PIMM, OF SYRACUSE, NEW YORK, ASSIGNORS TO LONG SALES CO., INC., OF SYRACUSE, NEW YORK, A CORPORATION OF NEW YORK.

ICE-CREAM MOLD.

Application filed July 30, 1925. Serial No. 47,040.

This invention relates to a device for molding and dispensing ice cream wafers for individual plate or sandwich service in which a hollow mold of predetermined capacity having a suitable operating handle is adapted to be inserted in a relatively larger mass of ice cream in such manner as to cleave therefrom a wafer of the same size and form as the interior of the mold and to provide the device with simple and efficient means for discharging the wafer from the mold when the latter with the wafer therein is withdrawn from the relatively larger mass.

Devices of this character must, of course, be frequently cleansed and sterilized for hygienic purposes and the main object is to construct the various parts in such manner that they may be easily separated and cleaned part by part and as readily and easily reassembled for use.

In serving ice cream in small molds of this character it is necessary to manipulate the molding device with one hand while the edible object to which the cream is applied is usually held in the other hand so that the ice cream wafer may be readily spread out thereon as it is discharged from the molding device. Another object of the invention is to provide simple and efficient means whereby the follower may be operated from its extreme inner position to its extreme outer position for discharging the wafer from the mold by a minimum amount of movement of the fingers of the hand which holds the molding device.

Other objects and uses relating to specific parts of the device will be brought out in the following description.

In the drawings:

Figure 1 is a side elevation, partly in section, of an ice cream molding device embodying the various features of our invention.

Figure 2 is an enlarged longitudinal sectional view of a portion of the same device taken on line 2—2, Figure 1.

Figure 3 is an enlarged transverse sectional view taken in the plane of line 3—3, Figure 2, and Figure 4 is an enlarged side elevation, partly broken away, of the same device.

Figure 5 is an end view of the flat tubular mold.

As illustrated, this device comprises an elongated tubular shank —1— preferably of non-corrodible metal, such as aluminum having one end provided with an enlarged ferrule —2— for receiving one end of a handle —3— which is preferably made of wood and is held in place by an axially extending clamping bolt —4—.

The inner end of the clamping bolt is threaded at —5— and engaged in a threaded aperture in the ferrule —2—, said clamping bolt being extended through a central opening in the handle —3— and may be secured to the outer end of the handle by any suitable fastening means, not necessary to herein illustrate or describe.

The other end of the shank —1— is provided with a flat tubular mold —6— which is preferably made of non-corrodible sheet metal and has both flat sides of one end thereof integrally united to the adjacent end of the shank —1— so as to extend some distance beyond the shank.

As illustrated, the mold is made in the form of a flat tube of substantially rectangular cross section except that the corners thereof are rounding in cross section as shown in Figure 5 thereby forming a corresponding lengthwise opening —8— of substantially the same cross sectional area from end to end and open at both ends.

The object in forming the corners —6′— of the mold —6— of rounding cross section is to enable the interior of the mold to be more easily and thoroughly cleansed than would be possible if the angles between the sides and opposed flat walls were sharp.

That is, if the tubular mold was formed with sharp corners or angles it would afford a lodging place for particles of ice cream and other matter and would be difficult to thoroughly clean whereas by making the sides smooth and rounding reduces to a minimum the liability of cream and foreign matter lodging in any portions of the interior of the tube and permits the mold to be more easily and thoroughly cleansed throughout the interior as well as the exterior areas thereof when the follower or plunger is removed in a manner hereinafter described.

An ejector —9— of substantially the same shape and size as the interior of the tubular mold —6— but of relatively narrow axial thickness is reciprocally slidable lengthwise of and within the tubular mold —6— for expelling the ice cream wafer therefrom after the mold has been inserted into a relatively larger mass of ice cream for the purpose of filling the same with a wafer of cream of the same size when the ejector —9— is at the extreme limit of its inward or backward movement or within the inner end of the mold as shown by full lines in Figure 1.

This follower preferably consists of a bar of non-corrodible metal and together with the tubular mold —6— extends laterally equal distances from and at opposite sides of the shank —1— so that those parts may lie in a plane co-axial with the axis of the handle —3— and its clamping member —4—.

The ejector —9— is provided with a central axially extending stem —10— which is reciprocally movable in a central guide opening —11— in the shank or frame —1— between the ferrule —2— and tubular mold —6—, the distance between the rear end of the mold —6— and front end of the ferrule —2— being somewhat greater than the length of the mold and therefore greater than the distance of travel of the ejector —9— from one extreme position to the other within the tubular mold so as to permit the operation of the plunger from one extreme position to the other by a suitable mechanism, presently described.

The shank —1— is provided with diametrically opposite lengthwise slots —7— in the flatwise plane of the mold —6— and between the rear end of the mold and front end of the ferrule —2— for receiving a part of the operating means for the ejector, the length of the slots being slightly greater than the length of the mold to allow a corresponding distance of movement of said operating part.

The rear and front ends of the slots —7— form stop shoulders —12— and —12'— adapted to be engaged by said part of the operating mechanism for limiting its rearward and forward movements and preventing complete removal of the ejector from the ends of the tubular mold except as hereinafter provided.

The diameter of the stem —10— is less than the transverse width and depth of the opening —8— in the ejector —9— so that when the operating mechanism is detached from the plunger it, together with the ejector, may be moved by hand back and forth through the tubular mold for cleaning the same or said plunger and ejector may be entirely withdrawn through the outer end of the mold to permit further cleansing or sterilizing of both the mold and ejector when necessary.

The shank —1— is provided with an integral bracket —13— projecting laterally from one side thereof between the ferrule —2— and guide bearing —11— and preferably in the direction of lateral extension of the corresponding side of the tubular mold —6— so that both the mold and bracket may lie in parallel planes.

A bell crank lever —14— is pivoted at —15— to the outer end of the bracket —13— to swing lengthwise of the shank —1— in substantially the same plane as the tubular mold —6— and is provided with a relatively long arm —14'— and a relatively shorter arm —14"—.

The free end of the longer arm extends transversely of and through a lengthwise slot —16— in the rear end of the stem —10— and is adapted to engage shoulders at the opposite ends of said slot as shown in Figure 1 whereby the rocking movement of the lever —14— in reverse directions about the axis of its pivot —15— will impart reciprocal movement to the stem —10— and ejector —9—.

The outer end of the shorter arm —14"— of the lever —14— is pivotally connected at —17— to one end of a link —18—, the latter having its other end pivotally connected at —19— to the intermediate portion of a hand lever —20—.

One end of the hand lever —20— is pivoted at —21— to the bracket —13— near its junction with the shank —1— to swing about an axis parallel with the pivot —15— and therefore lengthwise of the shank —1—, the other end of the lever —20— being extended along the outside of the front end of the handle —3— within easy reaching distance of the fingers of the hand of the operator when engaged with the handle —3— for supporting and manipulating the device.

The pivoted end of the hand lever —20— is provided with a circular housing —22— which, in this instance, is cast integral with the lever —20— and surrounds the pivoted pin —21— concentric therewith.

This housing —22— also serves to receive and partially conceal a coil spring —23— which surrounds a portion of the pivotal pin —21— and has one end engaged with the bracket —13— and its other end engaged with the lever —20— for retracting said lever and parts operated thereby to their normal starting positions with the follower —9— in the extreme inner end of the tubular mold —6— as shown by full lines in Figures 1 and 2.

The pivotal pin —15— is removable from the bracket —13— and lever —14— and is held in place by a cotter pin —24— or equivalent holding means which is also removable to permit the removal of the pin —15— thus permitting the lever —14— to be withdrawn from engageemnt with the plunger —10— which together with the ejector —9— may then be withdrawn endwise from the tubular mold —6— to permit those parts to be cleansed and sterilized when desired.

In like manner the pivotal pin —21— is removable and held in place by a cotter pin to permit the hand lever —20— to be detached from the frame.

All of the parts except the handle —3— are preferably made of non-corrodible material such as aluminum, the mold —6—, shank —1— and bracket —13— being preferably cast in a single piece for economy in manufacture and also to render those parts more easily cleansed and sterilized by a minimum number of joints in the entire apparatus.

The rear end of the mold —6— and its junction with the shank —1— is provided with a marginal shoulder —26— while the ejector —9— is provided with an annular flange —27— adapted to engage said shoulder when the ejector is at the extreme limit of its rearward movement for limiting said movement in that direction, the rear face of the ejector within the marginal flange —27— being convexed in cross section and is adapted to project through the rear open end of the mold as shown in Figures 1 and 4 so that it may be easily cleansed and may also serve in cooperation with the shoulder —26— to expel any cream or other foreign matter which may lodge within the mold at the rear of the ejector.

By multiplying the leverage between the hand lever —20— and plunger-operating member —14'— permits the free end of the hand lever to normally rest within easy reaching distance of the fingers of the operator when holding the device by the handle —3— and at the same time serving to expedite the discharge of the cream from the mold when the lever —20— is operated against the action of its retracting spring —23—.

What we claim is:

1. In an ice-cream mold of the character described, an ejector, and operating means therefor comprising a lever having relatively short and long arms at opposite sides of its fulcrum, the long arm having direct connection with the ejector, a hand-operated lever, a link connecting the intermediate portion of the hand lever with the short arm of the first-named lever, and a spring for operating the hand-lever in one direction.

2. In an ice cream dispensing device, a substantially flat tubular mold open at both ends and provided with a tubular shank coaxial therewith, said shank being secured to the flat sides of the mold at opposite sides of said axis and provided with lengthwise slots in opposite sides thereof, an ejector reciprocally movable in the mold and provided with a stem extending into the tubular shank and provided with a transverse opening registering with the slots in the shank, a bracket secured to the shank and projecting laterally therefrom, a lever pivoted between its ends to the bracket and having one arm relatively longer than the other arm and extending through the slots in the shank and into the opening in the stem, a hand-lever pivoted to the bracket between the pivot of the lever and shank, and a link connecting the hand lever with the shorter arm of the first-named lever, said shank being provided with a handle.

In witness whereof we have hereunto set our hands this 18th day of July 1925.

STEPHEN B. LONG.
JOHN C. PIMM.